(12) United States Patent
Schlummer

(10) Patent No.: US 7,293,982 B2
(45) Date of Patent: Nov. 13, 2007

(54) DEVICE FOR PRODUCING PHYSICALLY EXPANDED STRUCTURAL FOAMS DURING AN INJECTION MOLDING PROCESS INVOLVING THE USE OF DYNAMIC MIXING ELEMENTS

(75) Inventor: Christian Schlummer, Zurich (CH)

(73) Assignee: Peguform GmbH, Bötzingen (DE)

( * ) Notice: Subject to any disclaimer, the term of this patent is extended or adjusted under 35 U.S.C. 154(b) by 0 days.

(21) Appl. No.: 10/531,748

(22) PCT Filed: Oct. 9, 2003

(86) PCT No.: PCT/EP03/11197

§ 371 (c)(1),
(2), (4) Date: Apr. 18, 2005

(87) PCT Pub. No.: WO2004/037510

PCT Pub. Date: May 6, 2004

(65) Prior Publication Data

US 2006/0034958 A1    Feb. 16, 2006

(30) Foreign Application Priority Data

Oct. 22, 2002   (DE) ................................ 102 49 314

(51) Int. Cl.
B29C 44/42    (2006.01)
B29C 45/54    (2006.01)

(52) U.S. Cl. .................. 425/587; 425/4 R; 425/4 C; 425/130; 425/204; 425/208

(58) Field of Classification Search .............. 425/4 R, 425/4 C, 130, 203, 204, 208, 587
See application file for complete search history.

(56) References Cited

U.S. PATENT DOCUMENTS 2,848,739 A * 8/1958 Henning ...................... 264/53
3,902,704 A * 9/1975 Ishibashi et al. .............. 366/79

(Continued)

FOREIGN PATENT DOCUMENTS

DE          20 53 646          5/1972

(Continued)

OTHER PUBLICATIONS

WordNET definition for "permeable" [online], [retrieved on Feb. 23, 2007]. Retrieved from the Internet http://wordnet.princeton.edu/perl/webwn.*

*Primary Examiner*—Robert Davis
*Assistant Examiner*—Joseph Leyson
(74) *Attorney, Agent, or Firm*—Henry M. Feiereisen; Ursula B. Day

(57) ABSTRACT

Foamed molded articles can be produced during an injection molding process, among other things, by utilizing physical blowing agents. Existing technologies differ to the greatest possible extent in the manner how the blowing agent is introduced into the melt. One possibility is to supply the blowing agent via mixing elements (9) from porous or permeable material that are provided across the screw piston (1) and which by means of a suitable blowing agent input unit load and homogeneously charge the melt with blowing agent during the metering phase of the polymeric material. The resulting single phase polymer/blowing agent mixture, when injected in to an injection mold tool, produces due to a reduction in pressure, a foam-textured part.

13 Claims, 3 Drawing Sheets

U.S. PATENT DOCUMENTS

| | | | |
|---|---|---|---|
| 3,972,970 A * | 8/1976 | Taylor | 264/45.9 |
| 4,390,332 A * | 6/1983 | Hendry | 425/4 R |
| 5,297,948 A | 3/1994 | Sadr | |
| 5,975,871 A * | 11/1999 | Kudert et al. | 425/130 |
| 6,652,254 B2 * | 11/2003 | Shimura et al. | 425/4 R |
| 6,949,208 B1 * | 9/2005 | Kawauchi et al. | 264/50 |

FOREIGN PATENT DOCUMENTS

| | | |
|---|---|---|
| DE | 2 402 203 A | 7/1974 |
| DE | 101 50 329 A1 | 5/2003 |
| EP | 1 072 375 A | 1/2001 |
| EP | 1 256 430 A1 | 11/2002 |
| EP | 1 356 420 A1 | 10/2003 |
| WO | WO 02/054339 | 7/2002 |
| WO | WO 02/055282 * | 7/2002 |

\* cited by examiner

DEVICE FOR PRODUCING PHYSICALLY EXPANDED STRUCTURAL FOAMS DURING AN INJECTION MOLDING PROCESS INVOLVING THE USE OF DYNAMIC MIXING ELEMENTS

This application is a National Stage application of PCT/EP03/11197 filed on Oct. 9, 2003, which claims foreign priority to German application 102 49 314.6 filed on Oct. 22, 2002.

BACKGROUND OF THE INVENTION

The invention relates to supplying a physical blowing agent into the melt flow of an injection molding machine for uniform distribution therein, characterized by high reproducibility and certainty of performance during that process so as to realize a homogenous polymer/blowing agent mixture for use in a conventional injection molding machine.

From German patent DE 24 02 203 C3 and U.S. Pat. No. 5,297,948, devices are known for the production of foamed plastic molded parts, limited to a known extrusion method wherein the blowing agent is added in only some locally defined area. This invention is a further development of the device which is claimed in our patent application EP 1 256 430 A1 for the production of foamed plastic molded parts. This said device relates to an injection molding machine which is used for the production of a foamed plastic molded part. In order to produce a foamable plastic melt, a blowing agent is added to the plastic material and generates gas bubbles in the injection molding tool as a result of an expansion of blowing agent present in solution under pressure in the melt and a pressure drop during injection into the injection molding tool, whereby the gas bubbles are frozen as the melt cools down as a consequence of an increase in viscosity and finally forming the foamed texture. The device and method which are introduced by the EP 1 256 430 A1, utilize physical blowing agents. The supply of the physical blowing agent is made possible through the use of a porous casing. This porous casing is mounted at the screw piston, preferably in the area between the metering zone and the adjacently located downstream mixing zone. The porous casing is made from a porous or permeable material which permits the expulsion of the blowing agent under pressure in order for it to dissolve within the melt. Due to its large surface, this thin-walled cylindrically shaped casing is extraordinarily suited for bringing the gas into polymer melts of different composition. The solution as introduced by the EP 1 256 430 A1 relates to a gassing step, followed by a mixing step carried out by means of a mixing element mounted at the screw piston. The gassing treatment is carried out in a sector of the screw piston, which means that the gassing elements carry out the motions of the screw piston. Due to the use of the gassing elements in only a sector of the screw piston, a conventional injection molding machine can be fitted with the suitable screw piston so that only the screw piston needs to be exchanged in the entire installation in order to carry out the production of foamed plastic molded parts, thereby greatly reducing investment costs of the entire installation. While use of gassing equipment in the screw piston is known from DE 20 53 646 B, there, the openings for the blowing agent are configured as injection nozzles terminate in the distributor head. Through the blowing agent openings, the melt is charged with the blowing agent by means of a jet stream. If the embodiment of the gassing element is a porous casing which moves together with the screw piston in axial direction and at the same time also carries out the pistons rotational motion, it can charge the melt with the blowing agent in a uniform manner, as the porous surface does not promote release of only a single jet stream; at least, a bundle of jet streams is being released, although generally, with the device according to the invention, as also in EP 1 256 430 A1, the polymer melt is supplied with blowing agent bubbles. In the immediate vicinity of the porous casing, mixing between the gas and the polymer melt remains incomplete during the gas charge since the mixing-promoting shearing forces at the outer surface of the casing, are relatively small.

However, good mixing effects can be realized by means of introducing shear forces, expansion of the melt and recirculation of the melt.

A possible means to realize this goal is illustrated in DE 101 50 329 A1. The compressed blowing agent is brought into contact with the melt by means of a static mixing element, which is mounted between the plastification aggregate and the shut-off nozzle. A porous sinter-metal surface which surrounds the mixing elements serves as a contact element between blowing agent and polymer melt. Concentration—and pressure differentials cause the uptake of the blowing agent into the melt via diffusion—and sorption processes. The homogenisation of the polymer/blowing agent mixture happens during the injection process by means of webs associated with the static mixing elements and located intermittently in the melt channel. The recirculation, distribution and expansions of the melt within the mixer promote the diffusion processes. The uptake of the blowing agent into the melt is thereby promoted with a lasting effect. A drawback of the invention as disclosed in DE 101 50 329 A1 is that the addition of the blowing agent is carried out only right in front of the shut-off nozzle. Thus, very little time remains for a complete mixing of the melt prior to being fed through the shut-off valve into the adjacent cavity. Therefore, in order to realize a complete mixing of the melt with the blowing agent, the mixing element has to be configured with a greater length; alternatively higher pressure must be employed at the mixing element, so that the blowing agent will be distributed uniformly in the polymer melt prior to reaching the cavity via the shut-off valve. Likewise, EP 1 256 430 A1 mentions as a principal drawback of static mixing elements, the shear effects thereof which can damage the polymer matrix. A further drawback when utilizing a static mixing element in the area of the screw piston is the rather complex valve control employed to control the input of the blowing agent, whereby the cost of the installation as well as its susceptibility to failure is increased. When constructing the porous casing according to EP 1 356 420A1 there exists the danger that leakages occur in the large tight surfaces during operation, so that the blowing agent will no longer be exclusively released through the porous surface of the casing but, additionally is released through leaking at the tight points into the polymer melt. In another situation, due to a malfunction in the blowing agent system, a lowering of pressure can occur, so that the polymer melt which is under higher pressure might leak, via leaking tight points, into the blowing agent supply system.

SUMMARY OF THE INVENTION

In order to avoid these drawbacks in the prior art, according to the present invention, at least one dynamic mixing element is used, that is, a mixing element which is able to move in association with the screw piston and through which, at the same time, the blowing agent is introduced into the melt. The invention advantageously includes that porous or permeable mixing elements are provided at the screw piston downstream of a metering zone, which elements are loaded with blowing agent via a blowing agent supply device in the core of the screw piston and will feed the blowing agent into the melt in a uniform manner. During the plastification phase, the mixing elements rotate within the polymer melt and at same time the screw piston carries out a translation movement. This combination of translation and recirculation of the melt during the dosing phase causes a constant mixing and recirculation of the melt under the simultaneous load of the blowing agent, thereby realizing a homogenous polymer/blowing agent mixture.

Combining the mixing element and the gassing area in the same sector of the screw piston permits not only a combination of mixing element and blowing agent input within a narrow sector of the screw piston, but the dimension of the mixing element as a rotation symmetrical body also permits a pinpointed feed of blowing agent into the polymer melt. Furthermore, the amount of feed-in of blowing agent can be precisely controlled. Due to the rotation symmetrical configuration of the mixing bodies which project into the area of the gas release, a uniform mixing and homogenization of the blowing agent input is realized. The rotation and translation of the screw promote a thorough mixing even at a very short residence time of the melt within the gassing area.

The mixing element proper can be made from a porous or permeable material, while the screw piston element can be made from a material of higher strength. The dynamic forces which are generated by the motion of the mixing elements in the melt and impact upon the mixing elements thus affect only small mixing elements preferably configured as rotation symmetrical bodies. Thus, any stress which originates from the shear-or torsional forces can be kept at a minimum.

The mixing elements proper are provided with a seal to assure that the gas input takes place exclusively via the porous surface. This means that the amount of blowing agent distributed across the entire surface of the melt can be precisely controlled.

With the invention it is possible, by making only few alterations on a conventional injection molding machine, to produce textured foam molded parts which are generated by physical means and which are characterized by a compact outer shell and a foamed core which, when compared to other compact assembly pieces, exhibit material advantages with respect to weight, amount of material needed and corresponding costs thereof. Furthermore, there is no need to adjust the machine controlling function thus, keeping the investment costs at a minimum.

The invention as compared to the prior art exhibits the following advantages:

Small investment costs, since special machinery is not needed and only requirement is an exchange of the screw piston in a conventional injection molding machine.

Uniform input of the blowing agent due to the presence of a plurality of gas treatment points corresponding to the axial movement of the screw and co-rotating therewith during the polymer dosing phase.

Increased degree of homogenization due to intensive mixing processes during the course of gas treatment and under steady effective dimensions regarding the length and the shear region of the screw piston.

Optimal solubility behavior due to long periods of diffusion and large diffusion surfaces at small diffusion distances.

Good reproducibility of the method and independent of the dosing volume.

Increased effectiveness of the blowing agent

Easy exchange of defective or clogged mixing elements.

Possibility of combination of mixing elements of various construction and multiple possibilities of optimization relative to the polymer material to be treated.

By supplying the blowing agent into the polymer melt via the porous or permeable mixing rods in a uniform manner, optimization of the blowing agent input during the polymer dosing is realized. This results in improved solubility behavior due to long periods of diffusion and large diffusion surfaces at small diffusion distances. In addition, an increased reproducibility of the method can be recorded independent of the dosing volume indicating an optimal use of the blowing agent. The rotational and translational movements of the mixing elements within the polymer melt cause shear effects that prevent local concentration differentials and undesired agglomeration of the blowing agent. Finally, the invention advantageously has few investments costs, since no costly special machinery is required, but only the exchange of a screw piston in a conventional injection molding machine. An extended injection unit is likewise not required. A standard length of the injection unit in the range of 20- to 25 fold of the outer diameter of the screw piston suffices.

Preferably, in the area of the porous or permeable mixing elements, the diameter of the screw piston is somewhat reduced. Thus, with the increased root depth of the screw, and due to the small pressure level of the polymer melt in the area of the gassing, the blowing agent can be directly added, without the need for a separate dosing station.

Preferably, the mixing elements are placed uniformly and set-off in several rows across the circumference of the screw piston in order to realize a uniform distribution of the blowing fluid within the melt.

Preferably, the blowing agent is fed to the screw piston during the dosing phase via a high pressure seal housing radially surrounding the screw piston. Thereby, the physical blowing agent is present in the form of a fluid.

The high pressure seal housing receives the blowing agent from at least one pressure pump, with the advantage that no dosing station is required.

The high-pressure seal housing moves correspondingly with the axial movement of the screw piston in axial direction but without rotational movement. In this manner, while the polymer dosing takes place, a uniform input of the blowing agent is realized due to the flat, axially co-moving and rotating gassing area.

The polymer/blowing agent mixture is being homogenized in the course of gassing and at a constant effective length of the mixing—and shear elements of the screw piston. The injection of the blowing agent takes place during the dosing phase.

Figure 1:
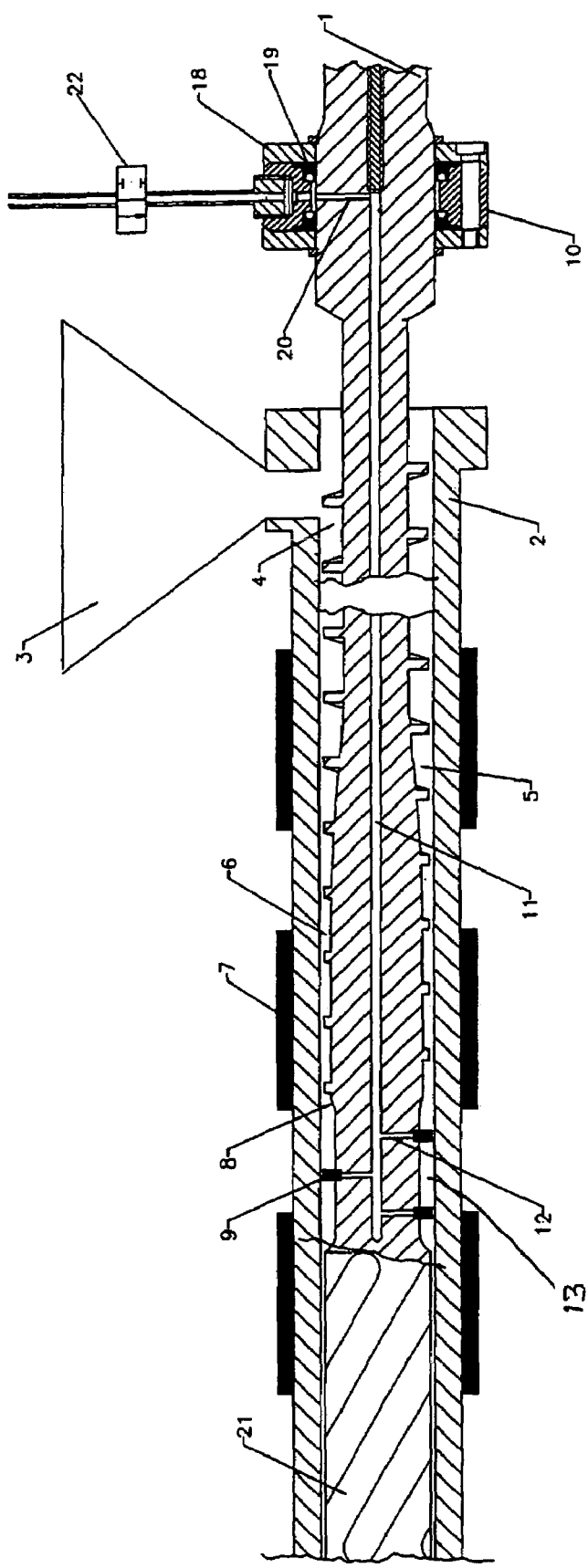
FIG. 1 is a sectional illustration of an injection molding machine with screw piston.
Figure 2:
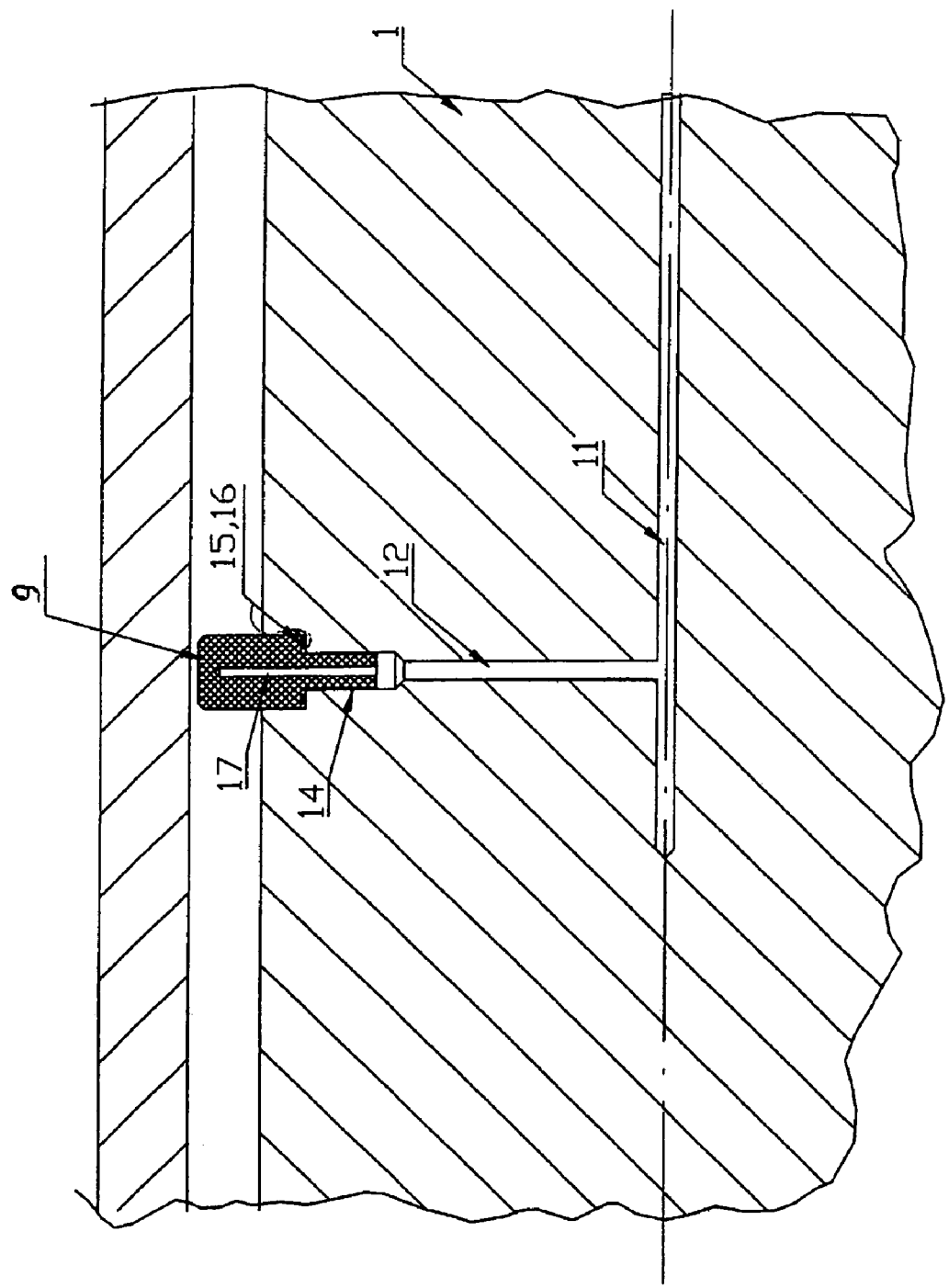
FIG. 2 shows a detail of the mixing element.

Following is a more detailed description of the invention with reference to FIG. 1 and FIG. 2.

FIG. 1 shows an injection molding machine with a screw piston 1 moving axially during the injection phase and rotating within the injection unit 2.

DETAILED DESCRIPTION OF PREFERRED EMBODIMENTS

The polymer granulate is fed via a material charge funnel 3 and is drawn in by the rotating screw piston 1 into the area of an feed-in zone 4. The connecting compression zone 5 and metering zone 6 cause the melting, compressing and homogenizing of the polymer material by means of the external cylinder heating 7, so that at the end of the metering zone 6, a homogenized polymer melt is realized that is thermically as well as materially homogeneous. At end 8 of the metering zone 6 of the screw piston 1, the root depth of the screw is discretely enlarged 8, that is, the diameter of the screw 1 is discretely reduced. In the area of the reduced diameter, porous and permeable mixing elements 9 are provided, which are loaded by a physical blowing agent via a blowing agent input device 10 and a bore 11, and whereby the blowing agent is supplied to the polymer melt in uniform manner.

The porous or permeable mixing elements 9 serve as a contact surface between the blowing agent and the polymer melt. The change in the root depth of the screw piston in this sector, the so-called gassing zone 13, leads to a pressure reduction. The condensed blowing agent, i.e. blowing fluid, is added via the bore 11 within the screw piston longitudinal axis and via several radial bores 12, for distribution of the gas via the mixing elements 9.

The porous or permeable mixing elements 9 can be formed from sintered metal or another permeable material such as for example, ceramic. The bores 11, 12 are connected upstream of the input funnel 3 with blowing agent input device 10. Thus, the seal housing 18 surrounds the screw piston 1 by means of a housing core and screw cap. The seal housing 18 is mounted between a drive device for the screw piston 1, not shown here, and the plastification cylinder 2 and secured against rotation. The seal housing 18 simultaneously moves with the axial motion of the screw piston 1. The axial stroke of screw piston 1 corresponds for example to the threefold diameter of the injection cylinder 2. The seal housing 18 is provided with special rotation seals 19 and centered at the screw by means of a floating ring. An axial displacement of the seal housing 18 is prevented by means of mechanical tensioning elements. The rotation seals 19 can be floating ring seals or radial packing rings. One or more radial bores 20 connect the pressure chamber of the blowing agent input device 10 with an axial bore 11 in the longitudinal axis of the screw piston 1.

After the input of the blowing agent across the surface of the mixing elements, conveying-effective shear elements 21 distribute the polymer blowing agent mixture. The blowing agent input device 10 receives the blowing agent preferably through commercially available pressure gas bottles. A valve 22 which may be electrically, pneumatically or hydraulically operated connects the blowing agent supply with the high-pressure seal housing 18 during each of the dosing phases of the polymer material, if needed, by using a throttle valve.

Figure 3:
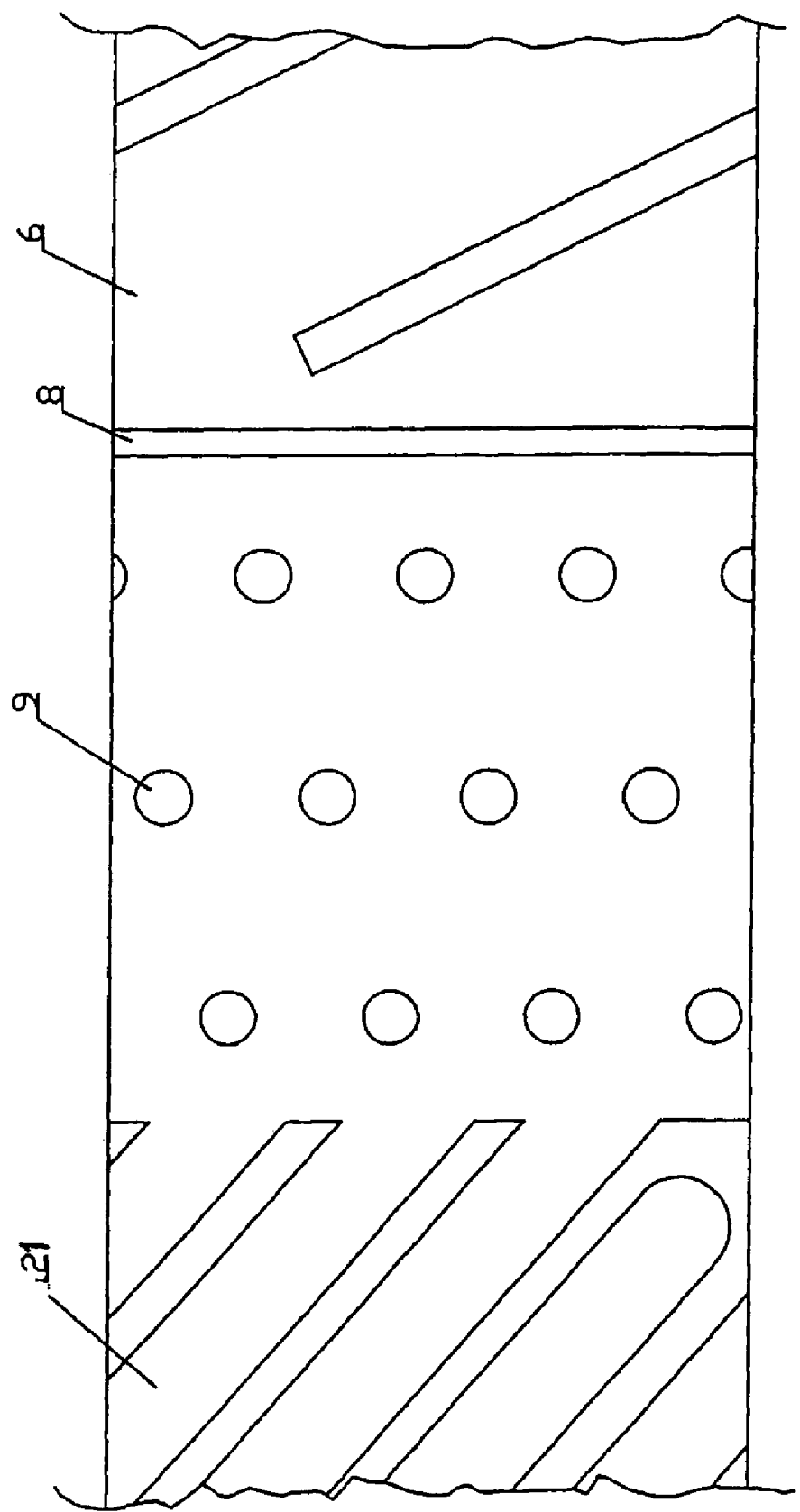
FIG. 3 shows a possible arrangement of mixing elements at the screw piston.

FIG. 2 shows an embodiment of the mixing elements. A rotational symmetric pin of porous material 9 is screwed into a threaded bore 14 in vertical orentation to the axis of the screw piston 1. Alternatively, this attachment can be accomplished by a press-fit or clamping device. As an alternative thereto, spring-loaded projections that engage into grooves at the screw piston could also be utilized. Such engagement mechanisms also support the disassembly of the mixing elements and may be needed for purposes of cleaning the apparatus. The mixing pin 9 as well as the bore in the screw piston 1 are stepped, thus forming a shoulder by means of which an axial tight point 15 can be realized. By utilizing copper sealing-disks or O-ring seals 16 which are high temperature-proof, the mixing pin can be sealed against the screw piston thus preventing uncontrolled penetration of blowing agent into the plastic melt via the contact surface between the mixing pin and screw piston. At the bottom of the threaded bore, a bore 12 is radially oriented relative to the axis of the screw piston and meets with the axial bore 11 in the screw piston thus representing the connection to the blowing agent input. In order to generate a uniform outflow of the blowing agent across the surface of the mixing pin, the pin can be provided with an axial bore 17. Thereby, the flow resistances through the permeable material are kept uniform at all points on the surface thereof. The dimension of the mixing elements, aside from being cylindrical, can also be in the shape of a cone. This provides the advantage of the tapering front face of the cone reducing the thermally induced inhomogenizations which occur due to heat dissipation in the direction toward the cylinder wall. Furthermore, the mixing elements can be dimensioned square shaped or rhomb shaped. In FIG. 3, a lay-out of the screw piston 1 is shown in the area of the gassing points between metering zone 6 and shear zone 21 and the respective distribution of the mixing elements 9.

A mixing element can also be configured as a cylinder of varying diameter, or in the shape of a cone or truncated cone or can have a rhomb-shaped or rectangular cross section, or can be configured as a straight or angled prism, or can be in the form of a curved- or helical line. As shown in FIG. 2, end portions of the mixing elements 9 terminate proximate a side wall of the cylinder.

LIST OF REFERENCE NUMERALS

1. Screw piston
2. Injection cylinder
3. Material funnel
4. Draw-in zone
5. Compression zone
6. Metering zone
7. Cylinder heating
8. Enlarged screw root
9. Mixing element
10. Blowing agent input unit
11. Bore
12. Radial bore
13. Gassing zone
14. Threaded bore
15. Axial tight point
16. O-ring seal
17. Axial bore
18. Seal housing
19. Rotation seal
20. Radial bore
21. Shear zone
22. Valve

What is claimed is:

1. A device for an injection molding machine used in the production of foamed plastic molded parts by an injection molding method utilizing a blowing agent comprising:
  a screw piston supported in an injection cylinder of an injection molding machine defined by a draw-in zone, a compression zone and a metering zone, wherein a diameter of the screw piston downstream following the metering zone is less than a diameter of the screw piston in the metering zone, and mixing elements extending from the screw piston circumferentially and spaced apart in the area of the reduced piston diameter, said mixing elements including end portions from a porous material are loaded with blowing agent, wherein the end portions of the mixing elements discharge the blowing agent into a plasticizing melt in the cylinder through the porous end portions into defined locations proximate the metering zone, and wherein the end portions of the mixing elements terminate proximate a side wall of the cylinder.

2. The device according to claim 1, wherein the device is provided with a blowing agent input unit for supplying blowing agent to an interior of the screw piston.

3. The device according to claim 1, wherein the mixing elements are from sintered-metal or ceramic.

4. The device according to claim 1, wherein at least one of the mixing elements is constructed as a rotation-symmetrical pin.

5. The device according to claim 1, wherein each of the mixing elements is provided with a means for connecting with the screw piston.

6. The device according to claim 5, wherein the means for connection with the screw piston includes a threaded bore.

7. The device according to claim 1, wherein at least one of the mixing elements is provided with a stepped portion.

8. The device according to claim 7, wherein the stepped portion is configured for receiving a seal.

9. The device according to claim 8, wherein the seal is from copper or a high heat-proof O-ring.

10. The device according to claim 1, wherein the mixing elements include cylinders of varying diameters.

11. The device according to claim 1, wherein the mixing elements are configured as a cone or a truncated cone.

12. The device according to claim 1, wherein the mixing elements are configured with a rhomb-shaped or rectangular cross section.

13. The device according to claim 1, wherein the mixing elements are configured as a straight prism or an angular prism.

* * * * *